March 15, 1966     H. E. STOCKMAN     3,241,018
TUNNEL DIODE ELECTROMECHANICAL MOVEMENT
Filed July 26, 1961
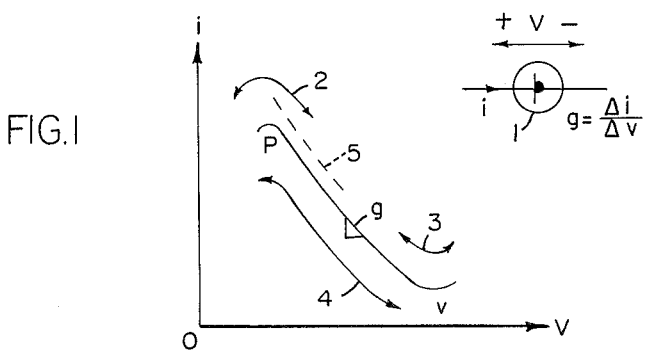
FIG.1
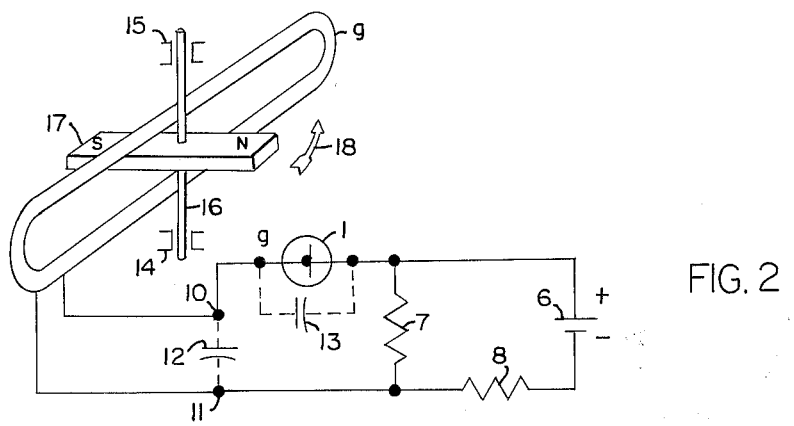
FIG. 2
FIG. 3
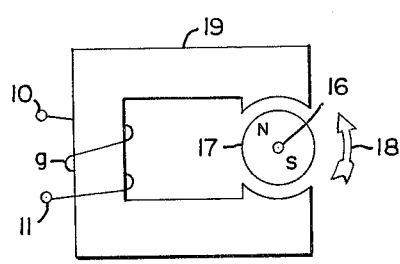
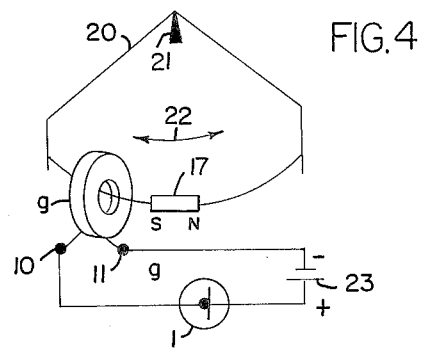
FIG. 4
*INVENTOR*
HARRY E. STOCKMAN
BY,
*Wolf, Greenfield & Hieken*
ATTORNEYS United States Patent Office 3,241,018
Patented Mar. 15, 1966

1

3,241,018
TUNNEL DIODE ELECTROMECHANICAL
MOVEMENT
Harry E. Stockman, Waltham, Mass.
(72 Gray St., Arlington, Mass. 02174)
Filed July 26, 1961, Ser. No. 127,018
5 Claims. (Cl. 318—138)

This invention pertains to a device in which a diode with negative slope current-voltage characteristic maintains rotational or translational motion by means of a single inductor.

More particularly, rotary or translatory motion is secured without the aid of contacts of any kind, or such switching and amplifying devices as transistors.

By this invention I desire to obtain advantage in electromechanical motion such as the following: (1) accomplishment of desired motion with exceedingly simple constructions with a minimum of components, since only three vital components are needed; an inductor without tap, a magnet free to move, and a diode with a negative-slope region, (2) accomplishment of desired motion without the use of contacts of any kind, making possible a maintenance-free design, (3) accomplishment of a motion that can directly be utilized as rotational motion, or, if so is preferred, by the addition of a restoring force be utilized as translational motion (pendulum motion), (4) accomplishment of rotational or translational motion by utilization of the negative-slope region of the diode with natural oscillations allowed to build up for excellence in achieved performance, (5) accomplishment of rotational motion either in an iron-free construction for minimum weight, or with soft-iron structure for the obtaining of maximum torque, (6) accomplishment of desired motion in nuclear radiation fields, where the use of a tunnel diode provides insensitivity to such radiation.

It is an object of this invention to provide rotational or translational motion of a magnetic body by means of a negative-slope diode, thus eliminating the use of contacts of any kind, switching and amplifying transistors, and similar active network elements.

It is another object of this invention to utilize a negative-slope diode such as a tunnel diode, in such a manner that the motion of a magnetic body induces the periodic voltage that serves as displacement voltage into and out of the negative-slope region of the diode, the resulting diode current providing the magnetic field change that moves the magnetic body in the established regenerative system.

It is still another object of this invention to accomplish the simplest possible motor and pendulum design with a minimum number of components, namely the three: the winding, the magnetic body, and the negative-slope diode.

It is a further object of this invention to give the storage elements such values that a high audio frequency or supersonic frequency characterizes the natural oscillation, the voltage excursions into the negative-slope region causing this natural oscillation to grow, and the voltage excursions out of the negative-slope region causing this natural oscillation to decay, so that the motion of the magnetic body causes repeated quenching with a sequence of wave trains as a result; a phenomena that may be utilized for enhanced performance.

It is a still further object of this invention to simplify the mechanical design of the motor to just one inductor in the close vicinity of the magnetic body, having the form of a rotating magnet, independent of the nature of and peculiar form of the active element providing the rotational energy.

It is an additional object of this invention to accomplish a very precise motion of the magnetic body in realization of the fact that the time constant of the envelope of the established wavetrain governs the mechanical motion of the magnetic body, with particular reference to turns per second and swings per second.

It is a still additional object of this invention to provide the choice of the motor design between an iron-free construction for light-weight applications and educational aid applications, or a high torque construction with soft-iron structure when high torque is required and the weight is of lesser importance.

It is a special object of this invention to make a motor or pendulum which operates in any nuclear radiation field due to the fact that a tunnel diode is used; the tunnel diode being known for its insensitivity to nuclear radiation.

Other features and novel aspects of the invention will become more apparent when the following description is considered. I shall now describe my invention with reference to FIG. 1, which is a representation of a negative-slope characteristic, FIG. 2, which is a perspective of the electromagnetic device with the magnetic body performing rotary motion, no use being made of soft-iron structure, FIG. 3, which is a drawing of the same electric motor as is shown in FIG. 2, except that it here is provided with a soft-iron structure, with a magnetic disc rotor, FIG. 4, which is a perspective of the electromagnetic device with the magnetic body performing translational or pendulum motion.

Referring to the drawings, and particularly FIG. 1, the negative-slope characteristic between the peak point $p$ and the valley point $v$ may represent that of a tunnel diode 1, biased to the vicinity of one of these points, or somewhere between them. The tunnel diode has a characteristic $i=f(v)$ with a conductance $g=\Delta i/\Delta v$, which has a negative value, a represenative value being $g=-0.01$ mho. The working point on the characteristics is determined by the applied direct bias voltage, with a periodic voltage added in form of the induced voltage caused by the motion of the magnetic body. The variational voltage may cover any one of the three indicated possible ranges 2, 3, and 4. The net effect of a specified voltage variation is that the device is thrown in and out of natural oscillation at, preferably, supersonic oscillation frequency. As an example, if the device is biased to the point $p$, the induced voltage provides the voltage coverage indicated by the double-arrow 2. Each time the excursion is into the negative-slope region, a supersonic frequency wavetrain develops, with the average current represented by the dotted arrow 5, providing the field change in the inductor included in the system, thus providing the force that maintains the magnetic body in motion. As the motion is intensified, so is the induced E.M.F. caused by the motion.

The motor in FIG. 2 consists of the diode 1, its driving source in the form of a battery 6 with voltage divider 7, 8, the inductor 9 with its two terminals 10, 11, its winding capacitance or extended winding capacitance 12, the diode capacitance or extended diode capacitance 13, the bearings 14, 15, the shaft 16, and the rotating magnetic body 17, spinning around in either the direction 18 or in the opposite direction, depending upon how it is started off.

The operation of the motor with reference to FIGS. 1 and 2 is as follows. If the rotor is started manually in the direction indicated by the arrow 18, its poles N and S will produce a periodic E.M.F., which adds to the fixed bias voltage caused by the battery. Thus periodic excursions into the negative-slope diode characteristc occur, each time yielding a superonic wavetrain, enhancing the dip in the diode current. The ensuing change in the magnetic field of the inductor 9 enhances the motion of the magnetic rotor, so that the E.M.F. is increased, the change in diode current and magnetic field increased, and so on, until the active interval of rotor motion has been completed.

The motor in FIG. 3 is similar to the one in FIG. 2, and only differs in the respect that a soft-iron structure 19 has been inserted, enclosing the magnetic body rotor 17, which now conveniently has the form of a magnetic disc with two poles. The operation is the same as that of the motor described with reference to FIG. 2.

The pendulum in FIG. 4 utilizes the gravitational field to provide the restoring force. The electric circuit is the same as that in FIG. 2, except that here a direct current supply 23 is used, which has the precisely required voltage, making a voltage divider unnecessary. The pendulum swings around the pivot 21 and describes the swinging motion indicated by the double-arrow 22. The pendulum double-arm 20 holds the magnetic body 17, so that it can swing in and out of the inductor 9. The electrical operation is the same as that described with reference to FIG. 1 and FIG. 2.

An actual working model of the invention substantially as shown in FIG. 2 embodied the following components:

Tunnel diode 1, GE type 1N2941.
Battery 6, 1.5 volts.
Resistor 7, 43 ohms.
Resistor 8, 110 oms.
Inductor 9, 36 millihenries with a resistance of 13 ohms made of 1100 turns of No. 24 enamel wire forming a coil 1" long with an inner diameter of 1" and an outer diameter of 2.5.".
Permanent magnet 17, length 2.25".

While I have described preferred embodiments of my invention, it will be understood that many other modifications may be made without any departure from the basic scope and spirit of my invention. This invention is by no means limited to the specific details and particular arrangements shown and described above for the purpose of illustration, since many modifications and variations may be introduced without any departure from the scope and spirit of my invention. I wish therefore to be limited not by the foregoing description, but on the contrary, solely by the claims granted me.

What is claimed is:
1. Electromechanical apparatus comprising,
a source of a magnetic field,
inductive means,
means for supporting said magnetic field source and said inductive means to permit relative continuously rotating movement therebetween which rotating relative movement induces an induced electrical signal provided by said inductive means, said means for supporting being fixed with respect to said inductive means,
a device having a negative resistance characteristic,
a source of electrical energy,
means including said device for intercoupling said electrical energy source and said inductive means,
and said source of electrical energy establishing a static bias upon said device so that said induced electrical signal combines with said static bias to cause said device to operate dynamically upon said negative resistance characteristic and coact with said electrical energy source to deliver energy to said inductive means which in turn coacts with said magnetic field source to sustain relative continuously rotating movement between said inductive means and said magnetic field source.

2. Electromechanical apparatus in accordance with claim 1 wherein said device having a negative resistance characteristic comprises a tunnel diode.

3. Electromechanical apparatus in accordance with claim 1 wherein said means for intercoupling said electrical energy source and said inductive means continuously establishes a path for the flow of energy therebetween.

4. Electromechanical apparatus in accordance with claim 1 wherein said magnetic field source comprises a bar magnet,
said inductive means comprises a coil,
and said means for supporting comprises an axle supporting said bar magnet with its plane generally perpendicular to that of said coil so that the poles of said bar magnet alternately pass through said coil upon rotation of said bar magnet about the axle axis.

5. Electromechanical apparatus in accordance with claim 4 wherein said inductive means comprises means defining opposed pole faces,
said magnetic field source comprises a magnet separating said pole faces,
and said means for supporting comprises means for supporting said magnet so that the poles thereof alternately face different ones of said pole faces.

References Cited by the Examiner
UNITED STATES PATENTS
| | | | |
|---|---|---|---|
| 2,810,843 | 10/1957 | Granqvist | 310—68 |
| 2,814,769 | 11/1957 | Williams | 318—171 |
| 3,046,460 | 7/1962 | Zemla | 318—132 |
| 3,084,316 | 4/1963 | Zemla | 318—132 |

FOREIGN PATENTS
| | | |
|---|---|---|
| 922,431 | 4/1963 | Great Britain. |
| 926,511 | 5/1963 | Great Britain. |

OTHER REFERENCES
Publication: The Tunnel Diode, In Electronic Engineering, page 245, April 1960.

MILTON O. HIRSHFIELD, *Primary Examiner.*
JOHN F. COUCH, *Examiner.*

Notice of Adverse Decision in Interferences

In Interference No. 96,071 involving Patent No. 3,241,018, H. E. Stockman, TUNNEL DIODE ELECTROMECHANICAL MOVEMENT, final judgment adverse to the patentee was rendered July 28, 1969, as to claims 1 and 3.

[*Official Gazette October 28, 1969.*]